United States Patent

[11] 3,631,813

| [72] | Inventor | George B. Dorey<br>540 Cote Saint Antoine Road, Westmount,<br>Quebec, Canada |
|---|---|---|
| [21] | Appl. No. | 873,239 |
| [22] | Filed | Nov. 3, 1969 |
| [45] | Patented | Jan. 4, 1972 |

[54] RACK AND TOGGLE HOPPER GATE-ACTUATING MECHANISM
7 Claims, 8 Drawing Figs.

[52] U.S. Cl. .................................................... 105/282 P,
105/293, 105/294, 105/305
[51] Int. Cl. ....................................................... B61d 7/20,
B61d 7/22, B61d 7/26
[50] Field of Search........................................... 105/282 A,
282 P, 305, 250, 253, 293, 294

[56] References Cited
UNITED STATES PATENTS

| 2,993,452 | 7/1961 | Dorey............................ | 105/305 X |
| 3,066,618 | 12/1962 | Gunnison..................... | 105/305 X |
| 3,085,517 | 4/1963 | Smith............................ | 105/305 X |
| 3,495,549 | 2/1970 | Dorey............................ | 105/305 X |

Primary Examiner—Arthur L. La Point
Assistant Examiner—Howard Beltran
Attorney—Nelson M. Ellison ABSTRACT: The improvement relates to a cog and rack mechanism for moving a sliding gate by means of a rotatable shaft having oppositely facing cogs fixedly secured thereto for engagement with rack teeth and wherein the cogs are extended lengthwise beyond the racks for gripping an operating bar therebetween. More particularly the improvement makes use of a structure wherein the engagement between the cogs and rack passes through toggle locked cycles effective at each half revolution of the shaft.

PATENTED JAN 4 1972

INVENTOR.
GEORGE B. DOREY

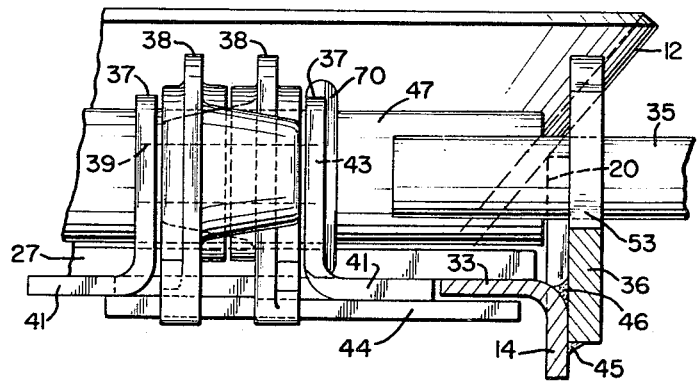
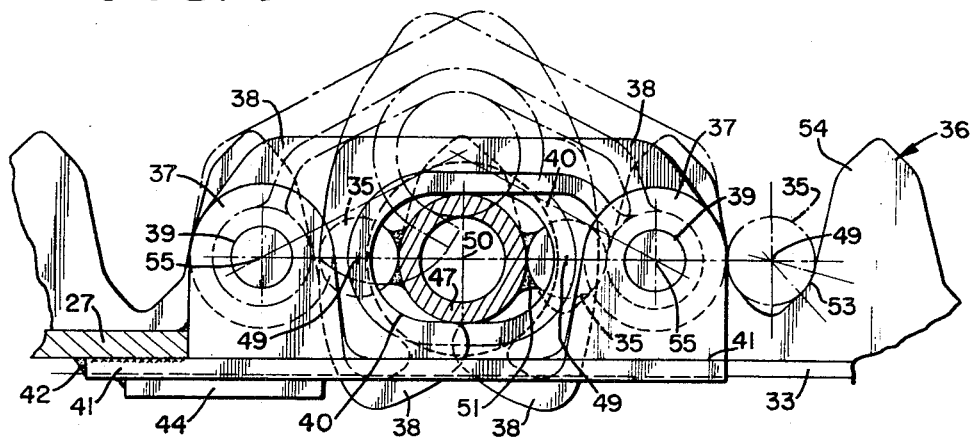
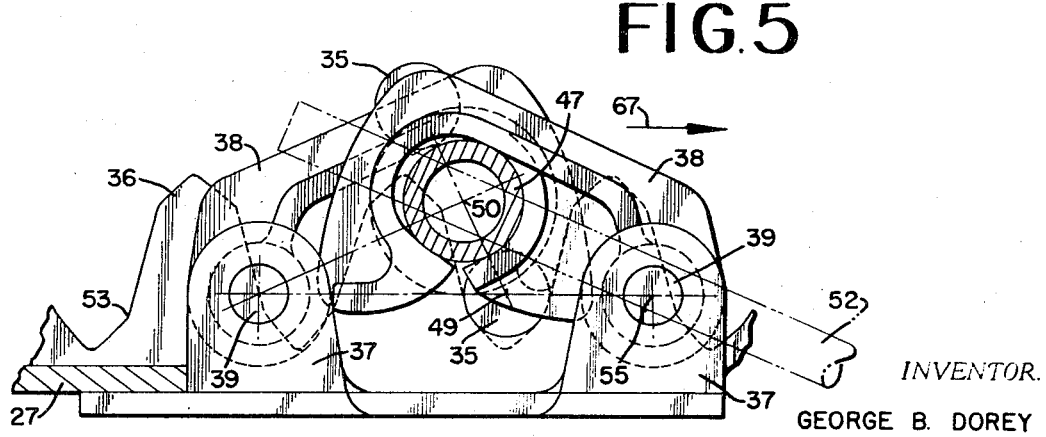
INVENTOR.
GEORGE B. DOREY

*INVENTOR.*
GEORGE B. DOREY 3,631,813

RACK AND TOGGLE HOPPER GATE-ACTUATING MECHANISM

FIELD OF THE INVENTION

The invention is by way of an improvement on my invention disclosed in copending U.S. Pat. application Ser. No. 693,877, entitled Rack and Pinion Sliding Gate Actuating Mechanism and filed Dec. 27, 1967, which is now U.S. Pat. No. 3,495,549.

An object of the invention among others is the attainment of greatly multiplied mechanical efficiency at various stages in the movement of a sliding gate by rotation of an operating shaft linked to the gate including cogs on opposite sides of the shaft in engaging relation with rack teeth whereby the shaft and cogs align with pockets, located between the teeth, at each half revolution of the shaft to close a toggle joint.

Another object of the invention is to utilize lengthwise extensions of the cogs as gripping means for holding a removable operating bar.

A further object of the invention is to provide for rotation of the shaft to an overcenter toggle locked position at the termination of the gate closing movement and provide conjointly operable locking means at each end of the shaft assembly for retaining the overcenter toggle locked relation.

The invention further resides in certain detail of parts and construction such as will be described.

For further comprehension of the invention reference may be had to the accompanying drawings wherein;

FIG. 3 is a vertical sectional fractional view of a portion of the outlet assembly, on an enlarged scale, as taken on a line 3—3 of FIG. 2.

FIG. 4 is a vertical sectional fractional view on an enlarged scale taken on a line 4—4 of FIG. 2 showing the shaft positioned midway between the toggle links and indicating by conventional dot and dash lines the position of the parts with the shaft in its uppermost position.

FIG. 5 is a view similar to FIG. 4 showing the position of the shaft assembly and linkage in relation to the rack teeth upon movement of the gate in the one indicated direction.

Figure 1:
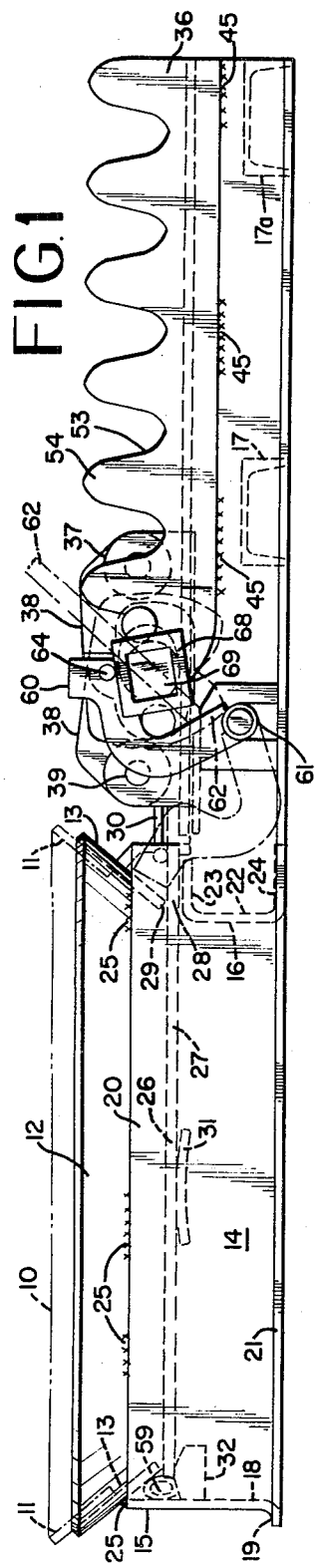
FIG. 1 is a vertical elevational side view of an outlet assembly, embodying the improvements, as applied to the lower portion of a hopper of a railway hopper car.
Figure 2:
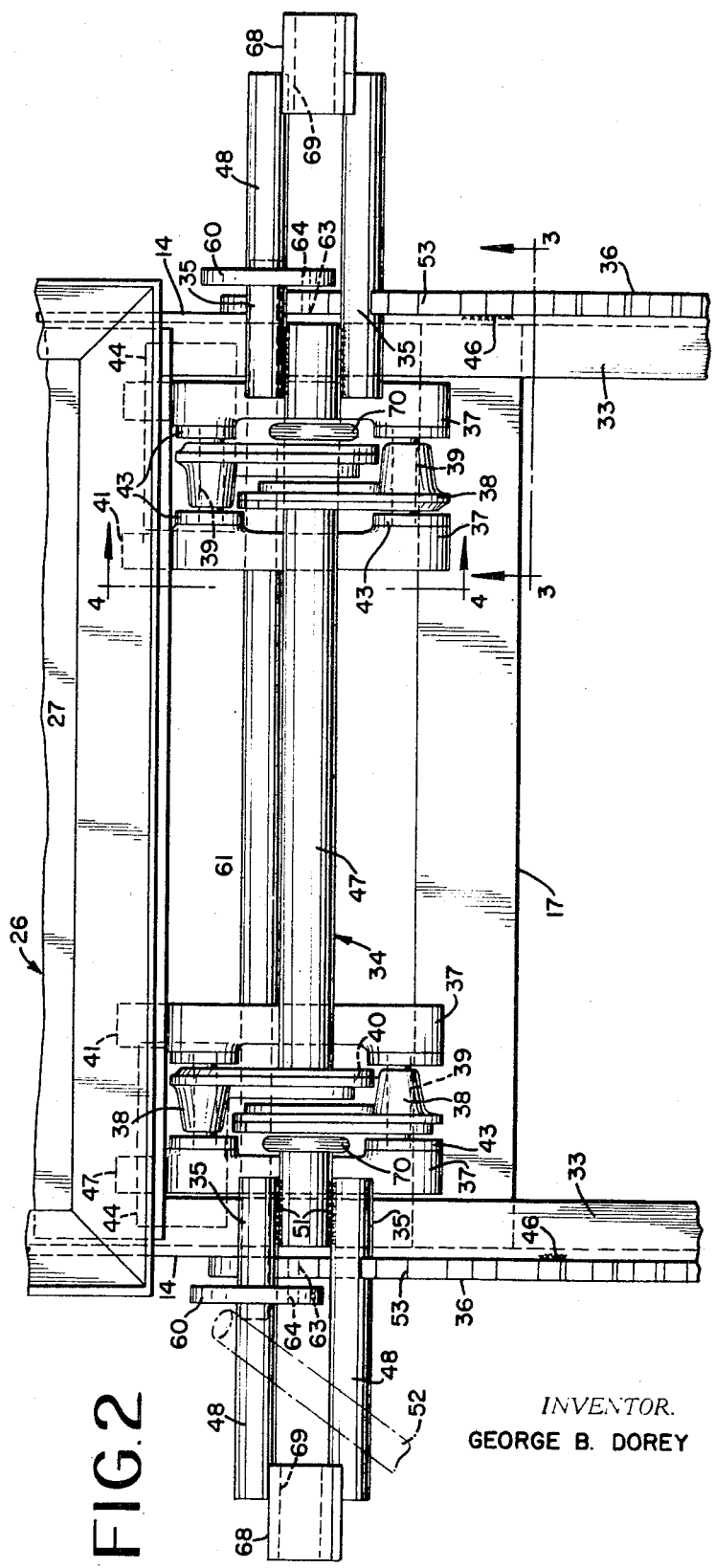
FIG. 2 is a plan view of a portion of the structure shown in FIG. 1, said view showing only so much of the structure as necessary to show the toggle rack mechanism and related parts.

Referring to the drawings wherein an embodiment of the improvement is shown as applied to the hopper of a railway car indicated by longitudinal and transverse sloping walls shown conventionally by dot and dash lines at 10 and 11. The outlet assembly proper includes an upper inverted truncate shaped portion comprising sloping walls 12 and 13 overlying the walls 10 and 11 of the hopper and nesting in a lower frame section comprising spaced longitudinal walls 14—14 united by transversely extending members 15, 16, 17 and 17a. The end member 15 is preferably of angle shape with an upstanding wall 18 and an outwardly extending lower marginal flange 19. The side members 14—14 likewise each include an upstanding wall 20 and a lower outwardly extending flange 21. The transversely extending member 16 is preferably of channel formation with a vertical web 22 and upper and lower forwardly extending flanges 23 and 24. The upper margins of upwardly extending walls 18 and 20 are extended to underlie the sloping walls of the upper section and welded thereto as seen at 25. The said walls 14—14 in combination with transverse walls 18 and 22 thus form a four-sided discharge chute defining the final discharge opening 26 of the assembly. Discharge of lading from the hopper to the chute is controlled by a sliding gate 27 movable through an opening 28 lying between the upper flange 23 of member 16 and the marginal edge 29 of the transverse sloping wall 13. The gate 27 projects appreciably beyond the transverse member 16 and said projecting portion extends under the protection of an angle shaped member 30 underlying the sloping wall 13.

The gate in its closed position rests on side and end supports indicated at 31 and 32 respectively and is adapted to move to open position on longitudinal extensions of the sidewall members 14—14 which are formed with inwardly extending supporting flanges 33 beyond the opening.

The gate is adapted to be moved through the medium of a rotatable shaft assembly 34 having oppositely disposed cog elements 35—35 for cooperation with toothed rack elements 36—36. The shaft assembly is movable with the gate and is retained in position thereto through the medium of forwardly projecting brackets 37—37 carrying oppositely extending links 38 pivoted at one end to the brackets at 39 and having the opposite ends of hook shape as seen at 40 encircling the shaft. As noted by reference to FIGS. 3 and 4, the brackets 37—37 are of generally angle shaped formation with one wall 41 underlying the gate and welded thereto as at 42 and vertically extending wall portions 43—43 adjacent the ends thereof forming supports for the pivots 39. The brackets 37—37 are arranged in pairs spaced apart to accommodate oppositely extending links 38—38 therebetween and be retained thereby against sidewise displacement. The wall 41 of the outer brackets 37 extends along the inwardly extending upper flange 33 of the side members 14—14 and an underlying guiding plate 44 secured to the underside of wall 41 is extended to underlie the flange 33 and limit upward displacement of the gate.

The rack elements 36 are preferably applied flatwise against the outer face of the walls 14 and welded thereto as at 45 and on the inner side are further welded as at 46 at the junction of the walls 14 and 33. The shaft assembly 34 includes a hollow tubular section 47 lying between the transversely spaced rack elements 36—36. Secured to each end of the shaft section 47 in overlying relation thereto at a location intermediate the rack elements 36 and the proximate bracket 37 are circularly shaped bars 48 the end portions of which constitute the cogs 35. The bars are disposed on opposite sides of the shaft with the axes 49 thereof aligned parallel with the axis 50 of the shaft section and are secured in place by welding as seen at 51. The said bars 48—48 are extended lengthwise outwardly beyond the rack elements 36 to provide gripping means therebetween for retaining a removable operating bar indicated conventionally at 52.

The rack elements 36 include a series of pockets 53 contoured for receiving the cogs 35 in seating relation and are separated by upwardly extending toothlike projections 54 over which the cogs are adapted to skip in the course of movement from one pocket to another. The bearing seats of the pockets are formed on radii centering about the axis 49 of the cogs when the latter and the axis 50 of the shaft 47 are in alignment as seen in FIG. 4. As will be noted by further reference to FIG. 4 the axes 55 of the link pivots 39 are disposed to align with the axes 49 and 50 of the cogs and shaft respectively at each half revolution of the shaft thereby providing for infinite multiplication of mechanical efficiency due to the straight line, jackknife, toggle-locking action.

Figure 7:
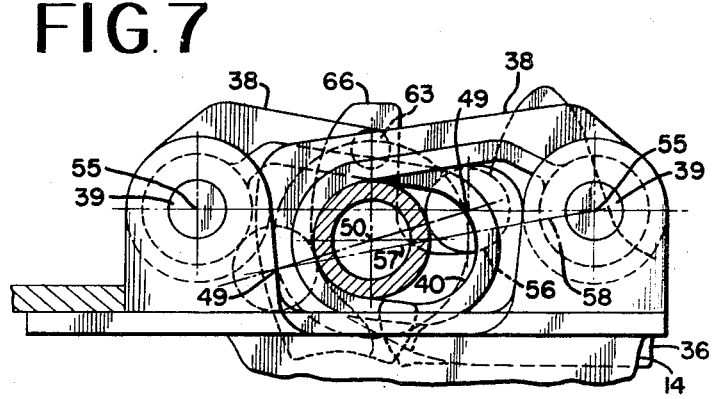
FIG. 7 is a view generally similar to FIGS. 4, 5 and 6 except that it is taken with the parts as positioned at the end of the gate closing movement and the linkage shown in overcenter toggle-locked relation.

At the termination of the gate-closing movement the toggle action of the linkage is continued beyond the straight line closure to assume a positive overcenter locking action and to this end the final tooth of the rack reacting against the cog in a closing direction is formed with a bearing pocket 56 for holding the bearing cog against upward displacement. In carrying out the overcenter locking action the distal swinging cog moves beyond the end of the rack to embrace the end tooth and come to rest at a level below the complementary seated tooth thereby disposing the line of thrust 57 at a downwardly sloping angle and also drawing the line of pull 58 of the toggle link 38 downwardly to cross the axis 50 of the shaft 47 as seen in FIG. 7.

Consequent on movement of the toggle to the overcenter locking stage a resilient gasket 59 interposed between the leading end of the gate and end wall 15 is compressed to provide against leakage.

Latching means for retaining the overcenter toggle-locked relation of the mechanism are provided in the form of hook-shaped detents 60 at each end of the shaft adapted to embrace the distal cog of the shaft assembly. The said detents 60 are nonrotatably mounted on a shaft 61 extending through the sidewalls 14—14 whereby the spaced detents may be conjointly operated from either end of the shaft. The shaft 61 is preferably mounted in slotted bearings 62 whereby limited upward displacement of the shaft and detent assembly is necessary to effect latching. The rack and detent are provided with apertures, as indicated at 63 and 64 respectively, disposed in registering alignment for admitting a sealing ribbon therethrough (not shown).

Figure 6:
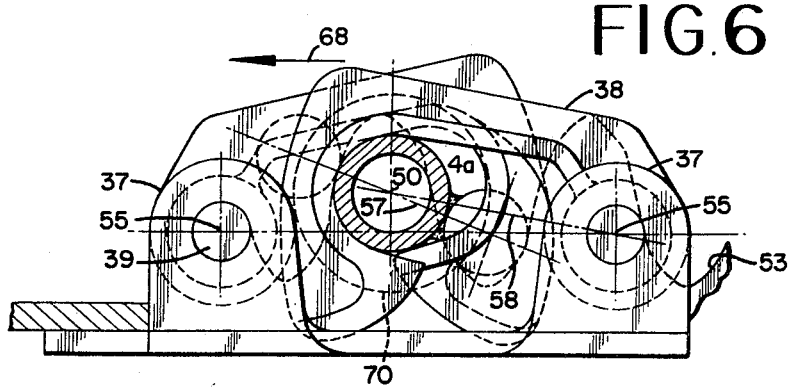
FIG. 6 is a view similar to FIG. 5 except that the parts are shown as positioned upon movement of the gate in the opposite direction and the closing movement of the toggle further advanced.
Figure 8:
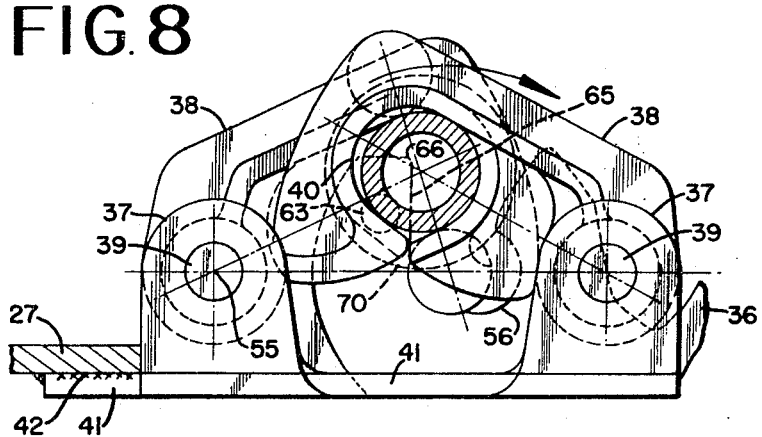
FIG. 8 is a view similar to FIG. 7 except that the linkage is shown with the overcenter toggle lock broken and lost motion incidental thereto taken up with the linkage as positioned at initiation of the gate opening movement.

The operation and advantages of the improvement may be best understood by reference to the movements in one opening and closing cycle of the gate. Assuming the gate in closed and sealed position as seen in FIG. 1 the detents 60 are first swung to an overbalanced position as indicated by conventional dot and dash lines and the operating bar 52 is then inserted between the extended spaced bars 48, the parts being then positioned as viewed in FIG. 7 with one of the links 38 acting as the tension member of the toggle mechanism and the complementary facing link inactive. Consequent upon rotation of the bar 52 in a clockwise direction as viewed in FIG. 7, the bearing cog is displaced from its seat to bear against the inner face 65 of the end tooth 66, said bodily movement of the shaft being accompanied by lost motion bringing the parts to the position shown in FIG. 8. The degree of lost motion so imparted is of importance in providing impact force effective in imparting breakaway starting force for initiating breakaway opening movement of the gate. Continued rotation of the shaft assembly in the indicated direction 67 as seen in FIG. 5 illustrates the folding action of the link and toggle arm as the gate-opening operation progresses. The position of the parts upon movement of the gate in the opposite direction 68 with the toggle mechanism approaching closure is illustrated in FIG. 6. It will thus be noted that reversal of direction of gate movement is accompanied with transfer of pulling effort from one link to the opposite link thus confining the toggle action to a closing jackknife movement irrespective of the direction in which the gate is moved.

The outer ends of the spaced bars 48—48 are maintained in spaced relation by means of operating heads 68 having a socket opening 69 for cooperation with a power tool. The shaft assembly is maintained against lengthwise displacement by annular collars 70 fixedly mounted of the shaft section 47 adjacent the outer links 38 and in contact therewith. Although one form of the invention has been illustrated and described, the specific terms employed are used in a generic sense only and not for purpose of limitation, the scope of the invention being defined by the claims.

What is claimed is:

1. An outlet assembly for a load-containing hopper having an opening for discharge of lading and a sliding gate for controlling discharge of lading movable to open position beyond the opening, in combination;
   a. rail means beyond the opening at each side thereof for slidably carrying the gate during movement,
   b. upstanding tooth rack means carried by the rail means presenting seating pockets intermediate the teeth,
   c. a rotatable operating shaft assembly for moving the gate and being movable therewith comprising,
      1. a shaft section extending transversely of the rail means and lying between the rack means,
      2. cog means mounted on the outward ends of the shaft section in aligned relation thereto for engagement with the rack means, and
      3. connecting means pivotally mounted to the gate and loosely embracing the shaft section,
   d. whereby said gate, said shaft section, and said cog means are operatively connected together so that when said shaft assembly is rotated, the cog means travels along the rack means to open and close the gate with resulting lost motion between the shaft section and the loosely embracing connecting means which accommodates limited vertical movement of the shaft assembly.

2. The invention as set forth in claim 1, wherein;
   a. the cog means at each end of the shaft section consists of a pair of cylindrically shaped bars rigidly connected to the shaft section, and
   b. the axes of the bars of each pair are aligned with the axes of the other pair and all said axes are parallel to that of the shaft section.

3. The invention as set forth in claim 2, wherein;
   a. the pockets of said rack means are formed on radii corresponding to the radii of the cylindrical bars of the cog means, and
   b. the axes of said shaft section and of all said bars are coincident with the corresponding axes of the pockets of the rack means at one point in each half revolution of the shaft assembly,
   c. whereby at each said half revolution of the shaft assembly when the said axes are coincident a toggle-locked condition of the shaft assembly results.

4. The invention as set forth in claim 3, wherein;
   a. the ends of the shaft section terminate inwardly of the rack means,
   b. the pair of cylindrical bars at each end of the cog means are symmetrically spaced about the shaft section and extend beyond the shaft section ends to engage the rack means, and
   c. the spacing of the teeth of the rack means, the dimensioning of the pockets of the rack means, the diameter of the shaft section, the diameters of the cylindrical cog bars are all constructed and arranged so that each cog bar will advance two rack pockets when the shaft assembly is rotated a half revolution.

5. The invention as set forth in claim 2, wherein;
   a. with respect to each end of the shaft assembly, the tooth of the rack means reacting against the cog at the closing movement of the gate is provided with a recess presenting a curved seat for holding said cog against upward displacement, and
   b. the other cog is swingable beyond the end of the rack to embrace the end tooth thereby and come to rest with the line of thrust passing through the axes of the shaft and cogs lying at a downwardly sloping angle and disposing said other cog below the level of the first cog,
   c. whereby there results an overcenter toggle-locked position of the cog means for positively holding the operating shaft assembly in closed hopper gate position.

6. The invention as set forth in claim 5, wherein;
   a. there is retaining means at each end of the shaft assembly for latching said cog means in overcenter toggle-locked position, said retaining means comprising,
      1. a latch shaft coextensive with and below the shaft section,
      2. hook-shaped detents mounted on said shaft,
      3. the hook-shaped detents being adapted to engage over said operating shaft assembly to hold said assembly in overcenter toggle-locked closed hopper gate position,
      4. said latching shaft being rotatable to engage and disengage the detents, and
      5. means for securing the retaining means in latched position to prevent accidental disengagement.

7. The invention as set forth in claim 1, wherein;
   a. said connecting means comprises, 1. angularly shaped brackets arranged in spaced relation with horizontally extending walls underlying the gate and secured thereto,
2. said brackets having vertical walls carrying pivots,
3. links pivotally mounted at one end to said pivots and extending toward each other with their other ends formed in a partially closed circular pattern which loosely embraces the shaft section, and
4. annular guiding flanges on the shaft section for coaction with the links for securing the shaft assembly against movement lengthwise of said assembly, b. whereby said shaft assembly is operatively mounted in a lost motion arrangement which accommodates limited vertical movement of said assembly when the cog means travels along the rack means.

* * * * *